Sept. 11, 1928.
F. F. FORSHEE
1,684,088
RANGE VENT
Filed Sept. 9, 1927
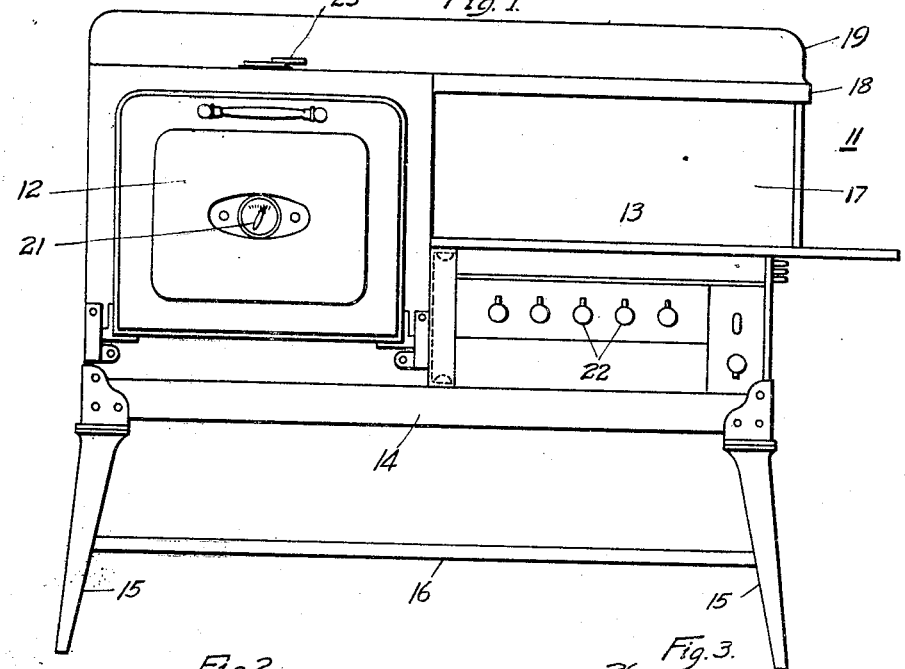
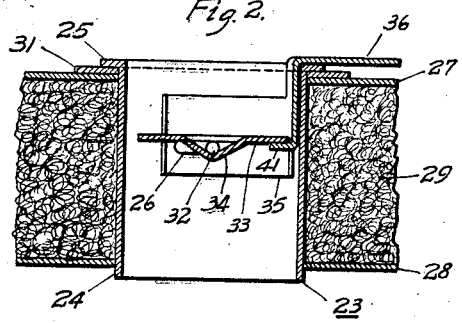
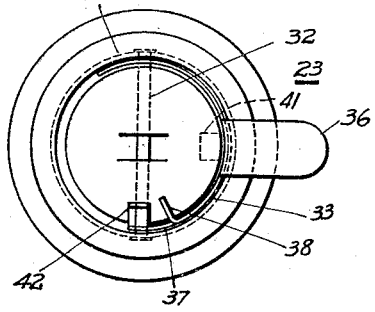
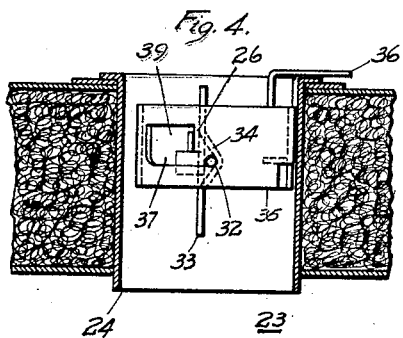
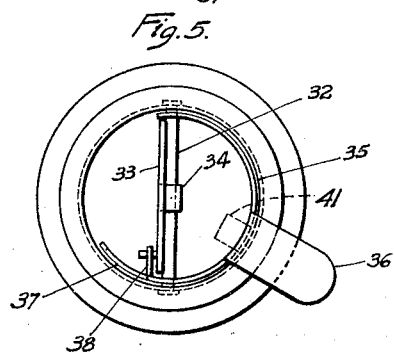
INVENTOR
Frank F. Forshee.
BY
Wesley F. Carr
ATTORNEY Patented Sept. 11, 1928.

1,684,088

UNITED STATES PATENT OFFICE.

FRANK F. FORSHEE, OF MANSFIELD, OHIO, ASSIGNOR TO WESTINGHOUSE ELECTRIC & MANUFACTURING COMPANY, A CORPORATION OF PENNSYLVANIA.

RANGE VENT.

Application filed September 9, 1927. Serial No. 218,435.

My invention relates to ovens and particularly to vents for ovens.

An object of my invention is to provide a relatively simple, inexpensive and easy assembled vent for an oven.

Another object of my invention is to provide a vent for an oven that shall have a lever handle so extending parallel to a surface of the oven as to be inconspicuous.

In practicing my invention, I provide an open-end tubular shell adapted to fit into an opening in the oven wall, a pivot pin extending laterally through the shell and supported by the walls thereof, a vent disk mounted on the pivot pin for turning movement thereon, and a substantially semi-annular actuating member located in the shell and co-axial therewith. The actuating member is provided with an actuating lug adapted to effect turning movement of the disk on the pivot pin and also with a stop lug for limiting the turning movement of the disk in one direction.

In the single sheet of drawings,

Figure 1 is a view, in front elevation, of an electric range with which is associated the device embodying my invention.

Fig. 2 is a view, in vertical longitudinal section, through a device embodying my invention illustrated as being mounted in an oven wall.

Fig. 3 is a top plan view of the vent alone.

Fig. 4 is a view similar to Fig. 2 but shown with the disk in its open position, and, Fig. 5 is a top plan view of the device when in the position shown in Fig. 4.

In Fig. 1, is illustrated an assembled electric range embodying an oven portion 12 and a stove portion 13, both of which are mounted in side-by-side relation on a suitable frame 14. Supporting legs 15 are provided and a shelf 16 may be provided if found desirable or necessary.

The stove portion 13 is of the usual construction and embodies a plurality of electric heating elements (not shown in detail). A back wall 17 is provided for the stove as well as an upper shelf 18 extending in the same plane as the top of the oven and a back panel 19 extending entirely across the electric range.

The oven is provided with the usual heating units (not shown in detail), the temperature of the oven being indicated by a thermometer or thermostat 21. The heating units in the oven and the stove may be controlled manually by switches 22 the actuating handles of which only are shown in the drawing. While I have illustrated and described an electric range, I do not desire to be limited to such construction in the use of the device embodying my invention, as I have described a particular range for illustrative purposes only.

A range vent designated generally by the numeral 23 comprises a substantially cylindrical tubular open-end shell 24, the upper or outer end portion of which is provided with a laterally extending integral flange 25. The shell is adapted to fit into openings cut in the outer and inner walls 27 and 28 at the top of the oven 12. The walls 27 and 28 may be of relatively thin sheet metal and have located therebetween a mass 29 of a suitable heat-insulating material, such as mineral wool. A finish ring 31 may be located between the wall 27 and the flange 25 in order to present a pleasing appearance.

A pivot pin 32 extends laterally through the shell to be supported thereby. A disk 33 is mounted on the pivot pin 32 for turning movement relatively thereto. The disk 33 is substantially circular in shape and has a central part 34 thereof punched out laterally of its plane surface to provide a hinge portion, the pivot pin 32 extending between the main portion of the disk and the portion 34, substantially as shown in Figs. 2 and 4 of the drawings.

An actuating member 35, of substantially semi-annular shape, is located within the shell 24 and is substantially co-axial therewith. The member 35 is made of an initially plane piece of sheet metal and is bent to the form shown in the drawings. The peripheral extent of the member 35 is slightly more than semi-annular, in order that it may fit loosely within the shell 24 and may be moved peripherally thereof. The member 35 is provided with a handle 36 which extends laterally of the semi-annular portion and in a plane just above the flange 25 so as to be inconspicuous when the vent is mounted in its proper operative position, as shown in Fig. 1 of the drawings.

The member 35 is provided with an elongated slot 26 adjacent to one end of the semi-annular portion and with a similar elongated slot or opening 37 adjacent to the other end of the semi-annular portion.

An actuating lug 38 is bent inwardly from the body portion of the member 35 just above the slot 37 which is a part of a large opening 39.

A stop lug 41 is bent inwardly from an intermediate part of the annular portion of the member 35 substantially midway between the ends thereof.

The member 35 is actuated peripherally by the handle 36 in either the one or the other direction to open or to close the vent. If the member 35 is turned in a clockwise direction from the position indicated in Fig. 3, the actuating lug 38 will operatively engage a lug 42, integral with the disk 33 and extending at right angles from the plane thereof immediately over one end of the pivot pin, to cause a turning movement of the disk from the position shown in Figs. 2 and 3 to the position shown in Figs. 4 and 5. The peripheral movement of the member 35 is limited in its above-described clockwise movement by the extent of the slots 26 and 37.

If it is desired to close the vent by moving the disk from the position shown in Figs. 4 and 5 to the position shown in Figs. 2 and 3, the member 35 is moved in a counter-clockwise direction from the position shown in Fig. 5. The actuating lug 38 on the member 35 engages the upper or outer plane surface of the disk 33 and causes a turning movement of the disk on the pivot pin until it has been moved to substantially the position shown in Figs. 2 and 3, when a peripheral portion thereof will engage the stop lug 41 on the member 35. The engagement of the disk and the stop lug 41 not only limits the turning movement of the disk on the pivot pin but limits also the turning movement of the member 35 in the shell 24 and on the pivot pin.

My invention thus provides a relatively simple device comprising a relatively small number of component members to constitute a vent for a range or oven.

While I have illustrated the device embodying my invention as applied to the oven of an electric range, I desire it to be understood that its use is not limited thereto, but that it may be applied to any oven or, in fact, to any device which requires a vent.

Various modifications may be made in the device embodying my invention without departing from the spirit and the scope thereof and I desire therefore, that only such limitations shall be placed thereon as are imposed by the prior art and are set forth in the appended claims.

I claim as my invention:

1. In an oven vent, the combination with an open-end tubular shell, a pivot pin extending laterally therethrough and a disk pivotally mounted on said pivot pin, of a semi-annular member for actuating said disk, coaxial with said shell and supported within the shell by the pivot pin.

2. In an oven vent, the combination with an open-end tubular shell, a pivot pin extending laterally therethrough and a disk pivotally mounted on said pivot pin, of a semi-annular member for actuating said disk, coaxial with said shell and supported within the shell by the pivot pin, said member embodying means for limiting its peripheral movement when actuating the disk.

3. In an oven vent, the combination with an open-end tubular shell, a pivot pin extending laterally therethrough, and a disk pivotally mounted on said pivot pin, of a semi-annular member for actuating said disk, coaxial with said shell and supported within the shell by the pivot pin, said member embodying means for limiting its peripheral movement when actuating the disk and embodying also means for limiting the turning movement of the disk in one direction of its movement.

4. In an oven vent, the combination with an open-end tubular shell, a pivot pin extending laterally through the walls of the shell and a disk pivotally supported on said pivot pin, of a semi-annular member in said shell for turning said disk on the pivot pin by a peripheral movement thereof.

5. In an oven vent, the combination with an open-end tubular shell, a pivot pin extending laterally through the walls of the shell and a disk pivotally supported on said pivot pin, of a semi-annular member in said shell for turning said disk on the pivot pin by a peripheral movement thereof, said disk and said member having cooperating lugs to permit of actuating the disk in one direction by a peripheral movement of said member.

6. In an oven vent, the combination with an open-end tubular shell, a pivot pin extending laterally through the walls of the shell and a disk pivotally supported on said pivot pin, of a semi-annular member in said shell for turning said disk on the pivot pin by a peripheral movement of said member, said disk and said member having cooperating lugs to permit of actuating the disk in one direction by a peripheral movement of said member, the turning movement of the disk being limited in one direction by a lug integral with said member.

7. In an oven vent, the combination with an open-end tubular shell, a pivot pin extending laterally therethrough and a disk pivotally mounted for turning movement on the pivot pin, said disk having a peripheral lug extending at right angles to its plane surface, of a semi-annular member in said shell, coaxial therewith and supported by said pivot pin, said member embodying an actuating lug extending inwardly therefrom, peripheral movement of the member in one direction causing the lugs on the disk and the member to engage to turn the disk in one direction and a peripheral movement of the member in the other direction causing the lug on the member to engage a plane surface of the disk to cause it to turn in the other direction.

8. In an oven vent, the combination with an open-end tubular shell, a pivot pin extending laterally through the walls of the shell and a disk mounted on the pivot pin for turning movement thereon, of a semi-annular member coaxial with said shell, located therein and supported by the pivot pin, said member embodying an integral actuating lug for effecting turning movement of the disk on the pin and a stop lug for limiting the turning movement of the disk in one direction.

9. In an oven vent, the combination with an open-end tubular shell, a pivot pin extending laterally through the walls of the shell and a disk mounted on the pivot pin for turning movement thereon, of a semi-annular member coaxial with said shell, located therein and supported by the pivot pin, said member embodying an integral actuating lug for effecting turning movement of the disk on the pin by a peripheral movement of the member and a stop lug for limiting the turning movement of the disk in one direction.

10. In an oven vent, the combination with an open-end tubular shell, a pivot pin extending laterally through the walls of the shell and a disk mounted on the pivot pin for turning movement thereon, of a semi-annular member coaxial with said shell, located therein and supported by the pivot pin, said member embodying an integral actuating lug for effecting turning movement of the disk on the pin and a stop lug for limiting the turning movement of the disk in one direction, the member being provided with elongated peripheral slots through which the pivot pin extends to limit its peripheral movement.

In testimony whereof, I have hereunto subscribed my name this 31st day of Aug., 1927.

FRANK F. FORSHEE.